(12) United States Patent
Hamada et al.

(10) Patent No.: US 8,087,657 B2
(45) Date of Patent: Jan. 3, 2012

(54) SHEET TRANSPORT APPARATUS AND IMAGE READING APPARATUS

(75) Inventors: Masataka Hamada, Fuefuki (JP); Fumihito Endo, Minamialps (JP); Junya Nakajima, Minamialps (JP); Koji Kanda, Kai (JP)

(73) Assignee: Nisca Corporation, Yamanashi-Ken (JP)

( * ) Notice: Subject to any disclaimer, the term of this patent is extended or adjusted under 35 U.S.C. 154(b) by 196 days.

(21) Appl. No.: 12/453,677

(22) Filed: May 19, 2009

(65) Prior Publication Data

US 2009/0289408 A1 Nov. 26, 2009

(30) Foreign Application Priority Data

May 20, 2008 (JP) ................................ 2008-131531

(51) Int. Cl.
*B65H 5/22* (2006.01)
(52) U.S. Cl. ....... 271/3.01; 474/903; 464/182; 403/317; 403/319
(58) Field of Classification Search ................ 271/3.01; 474/903; 464/182; 403/317, 318, 319
See application file for complete search history.

(56) References Cited

U.S. PATENT DOCUMENTS

| | | | | |
|---|---|---|---|---|
| 4,891,669 A * | 1/1990 | Hiroki | ........................... | 399/118 |
| 4,927,130 A * | 5/1990 | Tanaka et al. | ............... | 271/10.11 |
| 5,141,217 A * | 8/1992 | Lim et al. | ................... | 271/10.13 |
| 5,558,208 A * | 9/1996 | Kucharski | ...................... | 198/848 |
| 5,630,580 A * | 5/1997 | Tsao et al. | ................. | 271/10.13 |
| 5,961,112 A * | 10/1999 | Kim | ........................... | 271/10.05 |
| 6,457,707 B1 * | 10/2002 | Hendrix et al. | ............... | 271/117 |
| 6,547,239 B2 * | 4/2003 | Takata | ........................... | 271/274 |
| 6,661,986 B2 * | 12/2003 | Kitayama | ..................... | 399/167 |
| 6,882,813 B2 * | 4/2005 | Lee | ................................ | 399/126 |
| 7,267,502 B2 * | 9/2007 | Sawai | ........................... | 400/641 |
| 7,394,045 B2 * | 7/2008 | Sekiguchi et al. | ............ | 219/619 |
| 2005/0225022 A1 * | 10/2005 | Akiyama et al. | ............ | 271/10.03 |

FOREIGN PATENT DOCUMENTS

JP H07-320342 A 12/1995
JP 2003-125157 A 4/2003

* cited by examiner

*Primary Examiner* — Kaitlin Joerger
*Assistant Examiner* — Ernesto Suarez
(74) *Attorney, Agent, or Firm* — Manabu Kanesaka (57) ABSTRACT

A sheet transport apparatus includes a transport roller for transporting a sheet to the processing section, a driving motor for driving the transport roller, and a driving transmission mechanism. The driving transmission mechanism includes a rotary shaft, a transmission rotary member having a circular fit hole, a holder member with a press-fit hole having a curved part and a flat part, and a coupling mechanism for coupling the holder member and the transmission rotary member. The rotary shaft includes a fitting part having a circular cross section at one end side to be fitted into the circular fit hole, and a press-fit part having a curved part and a flat part press-fitted with the press-fit hole. The coupling mechanism includes a convex portion formed on a side of the transmission rotary member, and a concave portion formed on a side of the holder member press-fitted with the convex portion.

10 Claims, 7 Drawing Sheets

SHEET TRANSPORT APPARATUS AND IMAGE READING APPARATUS

BACKGROUND OF THE INVENTION

1. Field of the Invention

The present invention relates to a sheet transport apparatus in various printers, copiers, facsimiles and the like, and more specifically, to a driving mechanism of transport rollers for transporting a sheet to a sheet processing position at a constant velocity.

2. Description of Related Art

Generally, it is configured in copiers, facsimiles, printers and scanners that a sheet is transported to a predetermined processing position, and undergoes processing for reading the image, forming the image or the like in the processing position. Then, these apparatuses are provided with a sheet transport mechanism for sequentially separating sheets on a sheet basis to feed to a processing position.

For example, a scanner is provided with a sheet transport apparatus for feeding an original document sheet onto the platen to read the original document sheet. As this kind of scanner, the so-called sheet-through reading type has been known in which a sheet image of the moving original document sheet is read with a rested read optical series.

The sheet-through reading type is to read an original document sheet while moving the sheet to a predetermined reading position, therefore is short in processing time of the original document sheet, while providing a sheet transport mechanism with a simplified structure and the low number of components, and has the advantage enabling low cost to be actualized.

A sheet transport apparatus provided in this sheet-through reading type scanner is provided with a paper feed tray to mount original document sheets, a feeding roller for feeding the original document sheets on the paper feed tray, a paper feed roller and friction separating member for separating the fed original document sheets into a sheet to feed, a resist roller pair for aligning the front end of the original document sheet by causing the front end of the separated single sheet to hit the resist roller pair, and sending the sheet to a reading position, and a carry-in roller pair and carrying-out roller pair respectively provided on the upstream side and downstream side of the reading position to receive the original document sheet from the resist roller pair and pass the sheet through the reading position at a constant velocity (for example, Japanese Laid-Open Patent Publication No. 2003-125157).

Herein, in this type of sheet transport apparatus, as a transmission mechanism for transferring driving to each roller from a driving motor, used are a plurality of gears, pulleys, timing belts and the like. As a method of coupling the rotary shaft of each roller to the gear, pulley and the like, for example, such a method has been known that an end portion of the shaft is cut in the shape of a D, while fit holes of the corresponding gear and pulley are also formed in the shape of a D, and that the D-cut portion of the shaft is press-fitted to the D-shaped fit hole of the gear or pulley and fastened. This coupling method enables reliable transmission to the shaft without impairment of rotary torque and is excellent in this respect (for example, Japanese Laid-Open Patent Publication H07-320342).

However, in the aforementioned coupling method, since the shaft is press-fitted to the gear or pulley, the periphery of the gear or pulley expands. Particularly, since the expansion coefficient in the outer portion corresponding to the arc portion in the D-shaped fit hole is higher than the outer portion corresponding to the parallel portion, the periphery of the pulley becomes deformed after press-fitting to the shaft. In this way, the circularity error occurs due to misalignment of center axes of the shaft and gear or pulley, or local deformation of the pulley, and fluctuations occur in rotation transmission (velocity).

Then, such fluctuations in velocity do not cause any problems in normal transport of sheets, but when the velocity fluctuations occur in the carry-in roller and carrying-out roller for passing the original document sheet through a reading position at a constant velocity, fluctuations and distortion clearly appear in the read image, resulting in failure in the read image.

Particularly, in using a three-line color sensor provided with filters of R, G, B and three line sensors of R, G, B, respectively, since the same position of an original document sheet being transported is scanned and read sequentially by each line sensor while varying the time, and each scanned and read image data is subsequently composed, even a minute deviation in the scanning position of each line sensor with respect to the original document sheet causes a color displacement and pitch fluctuation in the image and becomes a serious problem.

The present invention was carried out in view of the aforementioned circumstances, and it is an object of the invention to provide a sheet transport apparatus for preventing the velocity of a sheet from fluctuating in the processing position of the sheet, and enabling excellent image processing.

SUMMARY OF THE INVENTION

To attain the aforementioned object, a sheet transport apparatus of the invention has a processing section having a processing position to process a sheet, sheet transport means for transporting the sheet to the processing section at a predetermined velocity, driving means for driving the sheet transport means, and driving transmission means for transferring driving of the driving means to the transport means, where the sheet transport means has at least one transport roller, the driving transmission means has a rotary shaft for supporting the transport roller, a rotary member with a circular fit hole to fit with the rotary shaft, a holder member where a D-shaped press-fit hole is formed to press-fit to the rotary shaft, and coupling means for coupling the holder member and the rotary member, in the rotary shaft are formed on its one end side a circular cross-section part with which the rotary member is fitted and a D-shaped cross-section part to which the holder member is press-fitted, and it is configured that driving transferred to the rotary member from a driving motor is transferred to the rotary shaft through the holder member.

By this configuration, it is possible to suppress stress of the rotary member when the rotary member is attached to the rotary shaft, and to reliably transfer driving of the rotary member to the rotary shaft without deforming the rotary member, and therefore, the transport roller is capable of transporting a sheet at a stable velocity without fluctuations in rotation.

DESCRIPTION OF THE PREFERRED EMBODIMENTS

Figure 1:
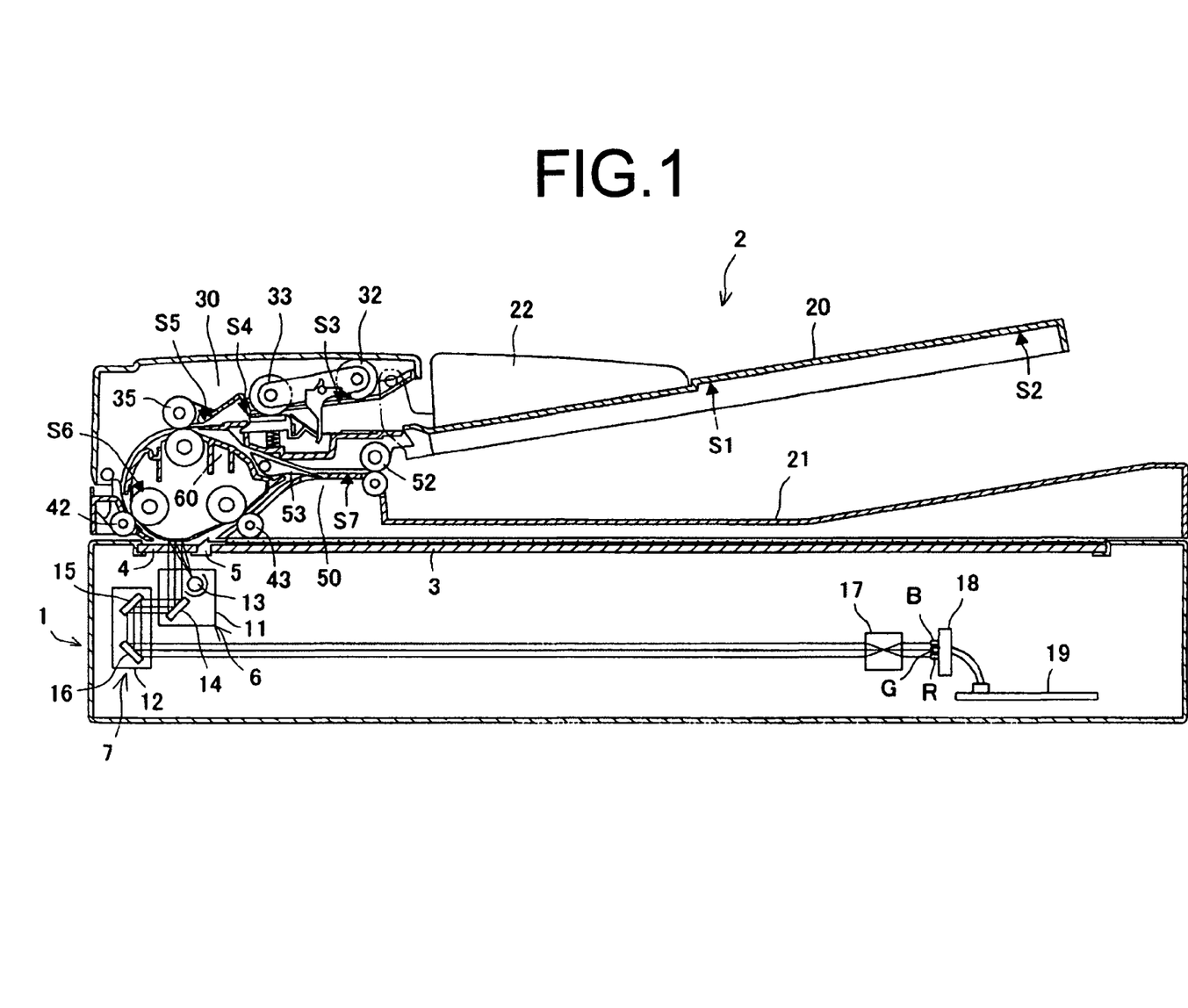
FIG. 1 is a cross-sectional view showing the entire configuration of a scanner provided with a sheet transport apparatus according to the invention.
Figure 2:
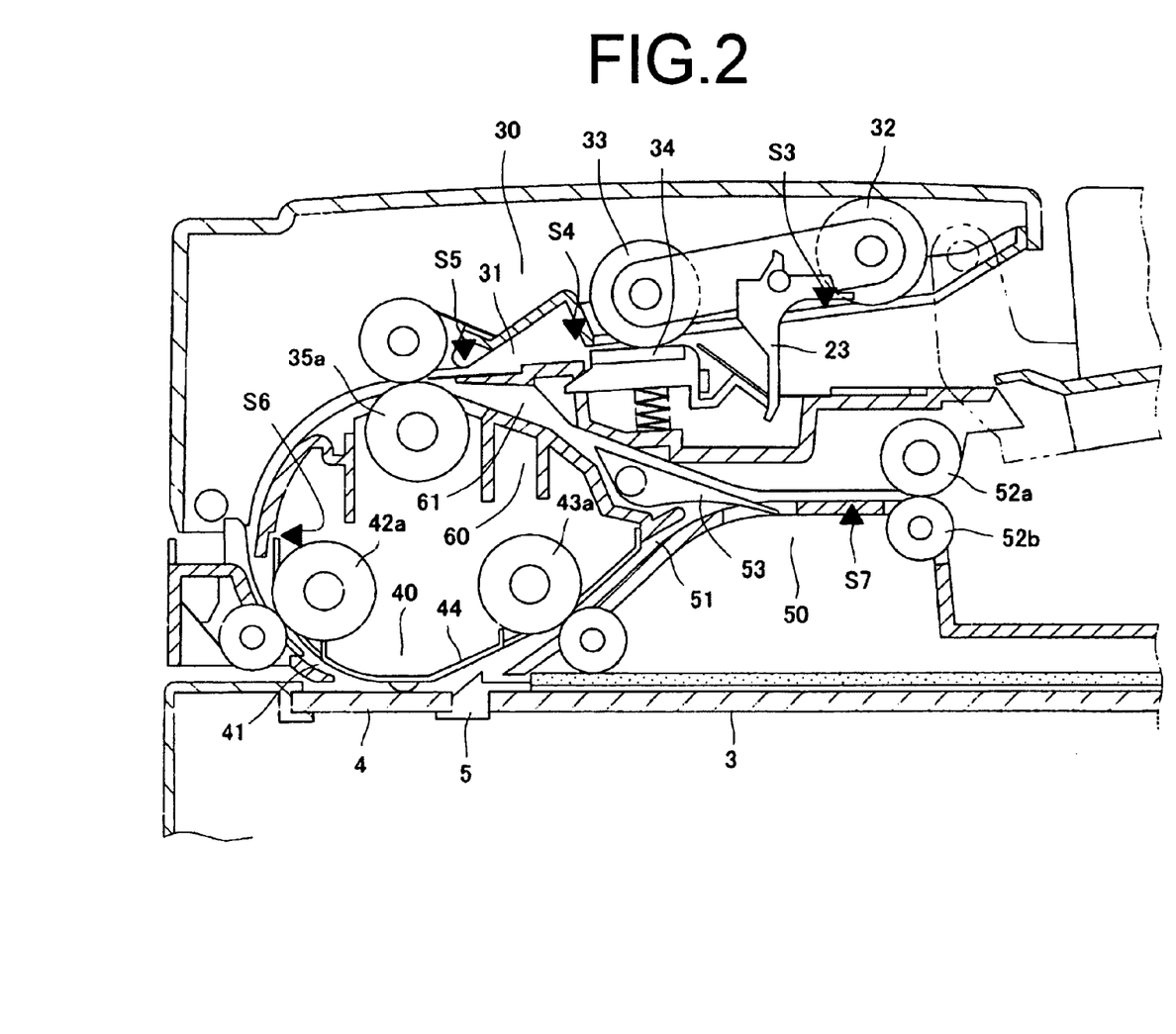
FIG. 2 is an enlarged cross-sectional view showing a configuration of a principal part of the sheet transport apparatus.

The present invention will be described below based on accompanying drawings. FIG. 1 is a drawing showing a cross-sectional view of a scanner and a sheet transport apparatus according to the invention, and FIG. 2 is a drawing showing a cross-sectional view of the principal part of the sheet transport apparatus.

In FIG. 1, "2" denotes the sheet transport apparatus installed in a scanner body 1, and the sheet transport apparatus 2 transports an original document sheet so that the sheet is passed through the top surface of contact glass 4 of the apparatus body 1.

The scanner body 1 has a first document read mode for reading an original document sheet mounted on first contact glass 3 by hand while moving a first and second optical carriages 11, 12 that are reading means described later, and a second document read mode for reading an original document sheet moving on second contact glass 4 by the sheet transport apparatus 2, while resting the first and second optical carriages 11, 12.

The reading means is provided with a light source 13 such as a xenon lamp or the like for irradiating an original document sheet, the first carriage 11 provided with a first mirror 14 to lead the reflected light from the original document sheet, the second carriage 12 provided with a second mirror 15 for leading the reflected light from the first mirror 14 and a third mirror 16 for leading the reflected light from the second mirror 15, a light-gathering lens 17 for gathering the reflected light of the original document sheet guided through the first mirror 14, second mirror 15 and third mirror 16, a three-line sensor 18 for receiving the reflected light to perform photoelectric conversion, and a processing board (control board) 19 for performing A/D conversion processing to convert an analog signal from the three-line sensor 18 to a digital signal, and delay processing to coincide three signals of R, G, B as the same-line information.

The reading operation of the reading means will be described next. In the first read mode for reading an original document sheet mounted on the first contact glass 3 by hand, a first carriage 6 and second carriage 7 are shifted at 2-to-1 velocities by driving of a sub-scanning motor (not shown), the light source 13 applies the application light to the original document sheet on the first contact glass 3, and the reflected light of the original document sheet is input to the three-line sensor 18 provided in line form through the first mirror 14, second mirror 15, third mirror 16 and lens 17. Then, the incident light is subjected to photoelectric conversion to read the original document sheet information (image information). Meanwhile, in the second read mode for reading an original document sheet moving on the second contact glass 4, the first carriage 11 and second carriage 12 are rested below the second contact glass 4, and the light source 13 applies the application light to an original document sheet transported by the sheet transport apparatus 2. Then, the reflected light of the original document sheet is input to the three-line sensor 18 by the first mirror 14, second mirror 15, third mirror 16 and lens 17, and as in the book original document sheet read mode, the incident light is subjected to photoelectric conversion by the three-line sensor 18 to read the original document sheet information (image information).

Then, an analog signal as the original document sheet information subjected to photoelectric conversion by the three-line sensor 18 is converted into a digital signal by an A/D converter or the like, subjected to predetermined image processing, and then, transmitted to an image formation apparatus not shown. Thereafter, the image formation apparatus forms an image on recording paper based on the received image data.

Herein, in the three-line sensor 18, three line sensors that are RGB sensors are arranged in parallel with one another on a monolithic board. The size of each of pixels is about 7 µm×7 µm (10 µm×10 µm, or 14 µm×14 µm), and the line distance of the sensors is about 10 to 20 times the pixel size (i.e. about 0.1~0.2 mm). Sine line distances are thus present among three sensors, it is not possible to read the same position on the original document sheet at the same time. For example, at a certain time, when it is assumed that the R sensor of the three-line sensor 18 reads information of a scanning line N, the G sensor reads information of a scanning line N-1, and that the B sensor reads information of a scanning line N-2, to obtain three-color information of R, G, B in the scanning line N, the reading means further scans to read the information of the scanning line N of each of the G sensor and B sensor, and performs the delay processing for composing the delayed information.

The sheet transport apparatus 2 is provided with a paper feed tray 20 enabling a plurality of original document sheets to be mounted thereon, a paper feed section (feeding means) 30 for separating the original document sheets on the paper feed tray 20 on a sheet basis to feed to the second contact glass 4, a transport section 40 for passing an original document sheet along the top surface of the second contact glass 4, a paper discharge section 50 for receiving the original document sheet passed through the top surface of the second contact glass 4 to discharge, and a paper discharge tray 21 for storing the original document sheet discharged from the paper discharge section 50. Further, the sheet transport apparatus 2 has a switch back section 60 for switching back the original document sheet discharged from the top surface of the second contact glass 4 in the paper discharge section 50, and feeding the original document sheet again to the paper feed section 30 to send to the top surface of the second contact glass 4. Herein, the paper feed tray 20 is inclined at some angle and disposed to secure a space above the paper discharge tray 21.

The original document sheets mounted on the paper feed tray 20 are regulated in their side portion by a side guide 22, while being regulated in their front end portion by a stopper 23.

The paper feed section 30 is formed of a feeding roller 32 capable of moving up and down to move downward to come into contact with the uppermost surface of the original document sheets on the paper feed tray 20 to feed the original document sheets, separating means formed of a paper feed roller 33 for feeding the original document sheets fed by the feeding roller 32 and a separating pad 34 for passing only a single sheet that is the uppermost original document sheet while preventing second and subsequent original document sheets from being fed, and a resist roller pair 35 for aligning the front end of the original document sheet by hitting the front end of the sheet separated by the separating means to feed to the downstream side, and feeds the original document sheet along a paper feed path 31.

The transport section 40 is provided with a pair of carry-in rollers (carrying-in roller pair) 42 on the upstream side of the second contact glass 4 to supply the original document sheet to the second contact glass 4, and a pair of carrying-out rollers (carrying-out roller pair) 43 on the downstream side to discharge the original document sheet from the second contact glass 4, and the original document sheet is transported along a transport path 41 formed of the second contact glass 4 and scoop guide 5 on the main body 1 side, and a white backup guide 44 on the sheet transport apparatus 2 side.

The paper discharge section 50 and switch back section 60 share part of the paper discharge tray 21 side, and in the shared portion is provided a paper discharge roller pair 52 for discharging the original document sheet to the paper discharge tray 21. This paper discharge roller pair 52 is controlled to rotate backward while nipping the rear end side of the original document sheet and switch back the original document sheet to feed to the paper feed section 30 in the two-side printing mode, and further configured so that the paper discharge driven roller 52b separates from the paper discharge driving roller 52a to be able to transport the original document sheet circulated from the switch back section 60 via the paper feed section 30 and transport section 40 without any trouble when the front and rear ends of the sheet pass each other. Further, a flapper 53 for guiding the original document sheet to the paper feed section 30 is provided in the shared portion of the paper discharge section 50 and switch back section 60. The flapper 53 is always biased downward by a biasing spring (not shown), and is pushed upward by the front end of the discharged original document sheet to permit the passage of the sheet when the original document sheet is fed to the paper discharge roller pair 52 along a paper discharge path 51, while being situated downward to block the paper discharge path 51 and guide the original document sheet to a switch back path 61 when the paper discharge roller pair 52 switches back the original document sheet.

A driving configuration of each roller will be described below.

Figure 3:
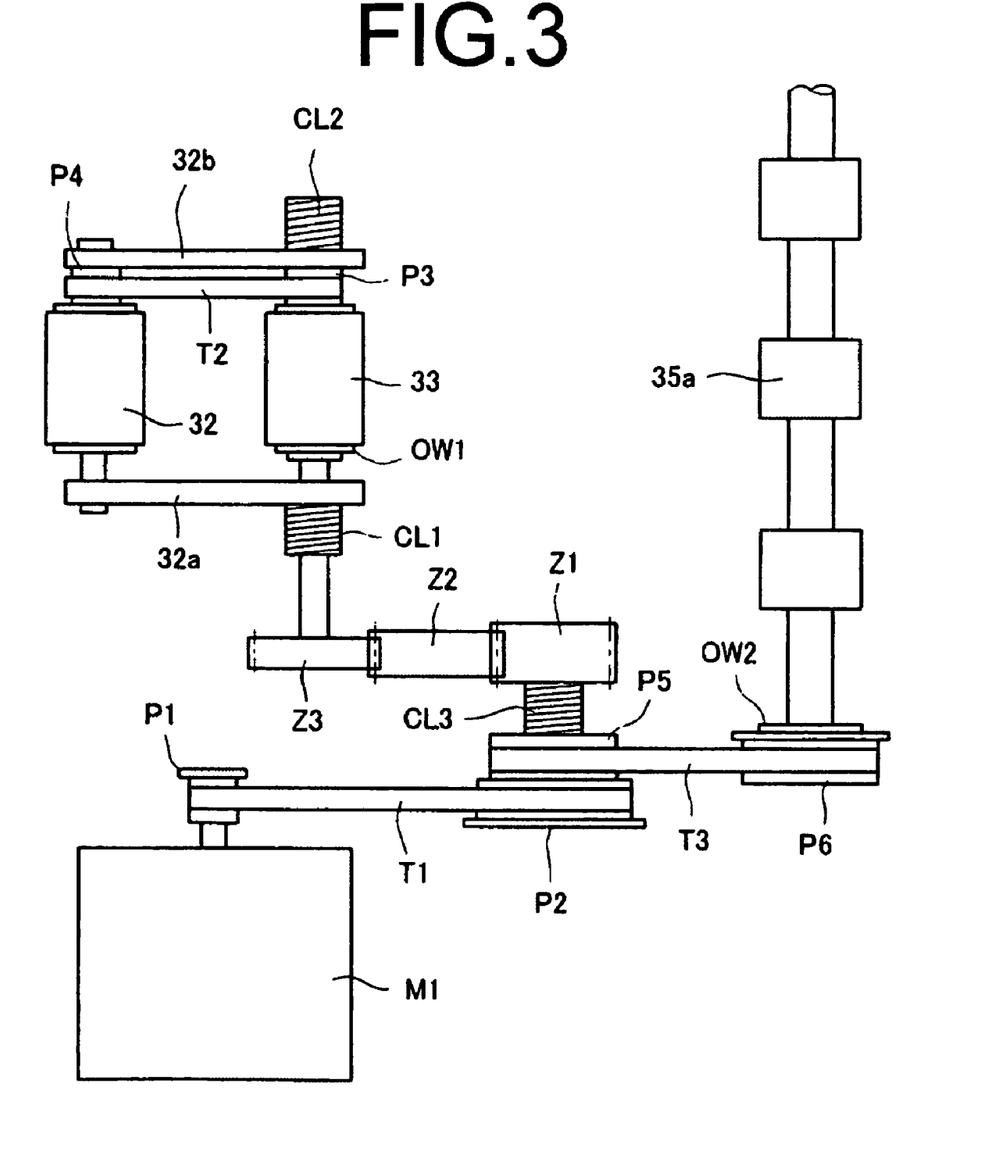
FIG. 3 is a driving configuration view showing a driving transmission mechanism of a paper feed driving section of the sheet transport apparatus.
Figure 4:
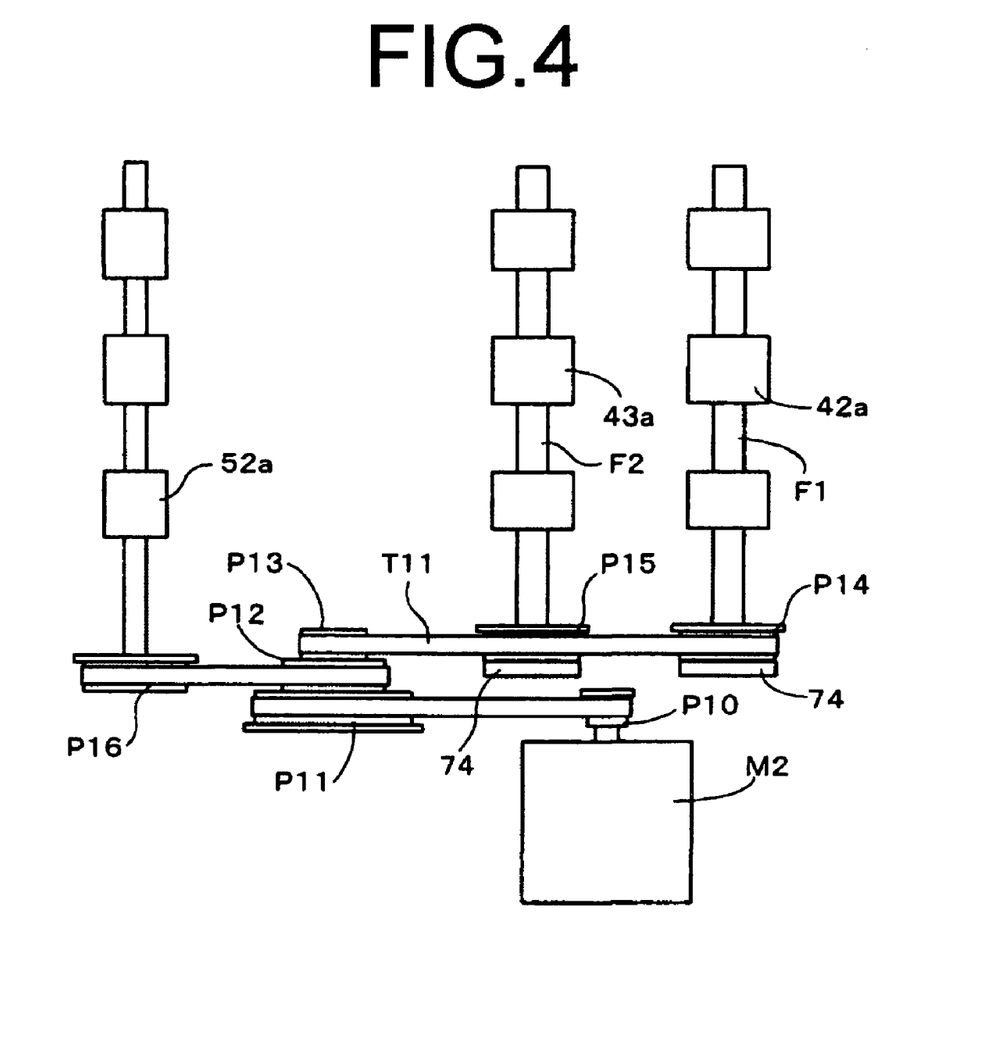
FIG. 4 is a driving configuration view showing a driving transmission mechanism of a transport driving section of the sheet transport apparatus.

In this embodiment, configured are a paper feed driving section formed of a paper feed motor M1 capable of rotating forward and backward, and a transmission mechanism for transferring driving of the paper feed motor M1 to the feeding roller 32, paper feed roller 33 and resist roller pair 35, and a transport driving section formed of a transport motor M2 and a transmission mechanism for transferring driving of the transport motor M2 to the carry-in roller pair 42, carrying-out roller pair 43, and paper discharge roller pair 52 of the paper discharge section 50.

A configuration of the paper feed driving section will be described first based on the driving diagram of FIG. 3. Forward driving of the paper feed motor M1 is transferred to a pulley P2 from a pulley P1 via a timing belt T1, driving of the pulley P2 is transferred to a gear Z1, gear Z2 and gear Z3 attached to the driving shaft of the paper feed roller 33 in this order, and the paper feed roller 33 rotates in the direction for feeding an original document sheet. The driving shaft of the paper feed roller 33 is provided with a pulley P3, and the driving is also transferred to the feeding roller 32 via a timing belt T2 extended between the pulley P3 and a pulley P4 provided in the shaft of the feeding roller 32. Further, the driving shaft of the paper feed roller 33 is provided with one end sides of lifting/lowering arms 32a and 32b for supporting the feeding roller 32, and it is configured that the lifting/lowering arms 32a, 32b rotate by rotation (forward driving of the paper feed motor M1) in the paper feed direction of the driving shaft, the feeding roller 32 thereby moves downward, and that when the feeding roller comes into contact with the original document sheet, the driving shaft of the paper feed roller 33 idles with respect to the lifting/lowering arm 32a by the action of a spring clutch CL1 and spring clutch CL2. At this point, the resist driving roller 35a is coupled by a timing belt T3 extended between a pulley P6 provided in the driving shaft of the roller 35a and a pulley P5 provided in the same shaft as that of the pulley P2, but does not rotate due to the action of a one-way clutch OW2 provided inside the pulley P6.

Backward driving of the paper feed motor M1 is transferred to the pulley P2 from the pulley P1 via the timing belt T1, further transferred to the pulley P6 attached to the shaft of the resist driving roller 35a from the pulley P5 provided in the same shaft as that of the pulley P2 via the timing belt T3, and rotates the resist driving roller 35a in the paper feed direction. At this point, the backward driving of the paper feed motor M1 is also transferred to the driving shaft of the paper feed roller 33, rotates the lifting/lowering arms 32a, 32b counterclockwise, and thereby moves the feeding roller 32 upward, but the paper feed roller 33 does not rotate due to the action of a one-way clutch OW1 provided therein. The lifted lifting/lowering arms 32a, 32b come into contact with a regulating member 32c as shown in FIG. 3, and it is configured that the driving shaft 33a of the paper feed roller 33 idles with respect to the lifting/lowering arms 32a, 32b due to the action of a spring clutch CL3.

The transport motor M2 transfers driving to an idler wheel coupled to three pulleys P11, P12, P13 from a pulley P10 provided in the driving shaft of the motor M2 via a timing belt T10, the driving is concurrently transferred to a pulley P14 attached to a shaft F1 of the carry-in driving roller 42a and P15 attached to a shaft F2 of the carrying-out driving roller 43a from the pulley P13 via a timing belt T11, and the carry-in roller 42 and carrying-out roller 43 are rotated forward or backward. Further, the driving of the transport motor M2 transferred to the pulley 11 via the timing belt T10 is transferred to a pulley P16 attached to the shaft of the paper discharge driving roller 52a from the pulley 12 via a timing belt T12, and the paper discharge roller 52a is rotated forward or backward.

Meanwhile, the paper discharge roller pair 52 is configured to be able to distance, and as the driving source, a pressure-contact solenoid SOL is provided.

In addition, in the driving shaft of each of the paper feed roller 33, resist driving roller 35a, and paper discharge driving roller 52a, the end portion of the shaft is cut in the shape of a D, and a D-shaped press-fit hole is formed in each of the gear Z3, and pulleys P6 and P16 associated with respective shafts. Then, each of the gear and pulleys is press-fitted to the D-shaped portion of each shaft and attached, and each shaft and the gear Z3 or pulley P6, or P16 are fastened.

Herein, with respect to the shafts and pulleys of the carry-in driving roller 42a and carrying-out driving roller 43a for passing an original document sheet to transport to the reading position set on the top surface of the second contact glass 4, when press-fit fastening by D-cut is adopted as in the other roller shafts as described above, the circularity error occurs due to misalignment of center axes of the shaft and pulley by nonuniform stress in the press-fit contact portion, and local deformation of the D-shaped press-fit hole of the pulley. The error causes fluctuations in rotation transmission (fluctuations in original document sheet feeding), and read image failure such as a fluctuation, distortion, color displacement and the like arises in the read image.

Therefore, in this embodiment, only in driving rollers of the carry-in roller pair 42 and carrying-out roller pair 43a to transport a sheet to the reading position set on the top surface of the second contact glass 4, substituting for forming the pulley and shaft in D form to press-fit and fasten, such a configuration is adopted that driving from the driving motor is transferred to the shaft via another member.

This configuration will be described below based on FIGS. 5 and 6. FIGS. 5(a) and 5(b) are exploded perspective view and fastening state perspective view to explain the shaft transmission mechanism, and FIG. 6 is a plan view showing the coupling state of the pulley and pulley holder. In addition, the shaft transmission mechanism provided with the carry-in roller driving shaft F1 and carry-in roller driving pulley P14 has the same configuration as that of the shaft transmission mechanism provided with the carrying-out roller driving shaft F2 and carrying-out roller driving pulley P15, and therefore, for the sake of convenience, descriptions are given to the shaft transmission mechanism on the carry-in roller driving shaft F1 side.

Figure 5A:
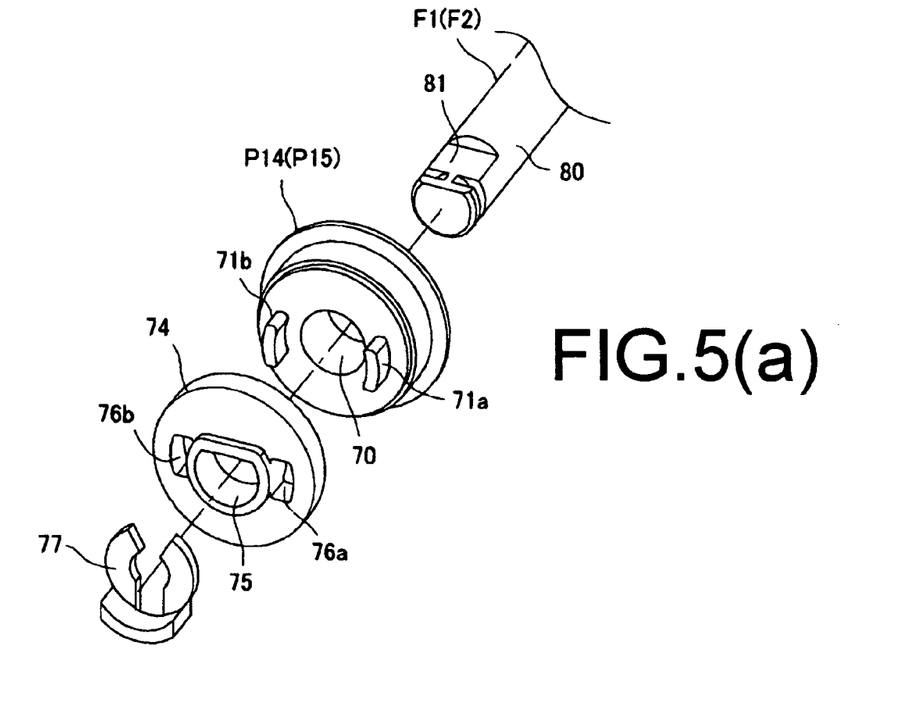
FIG. 5 is a perspective view showing a shaft transmission mechanism.
Figure 5B:
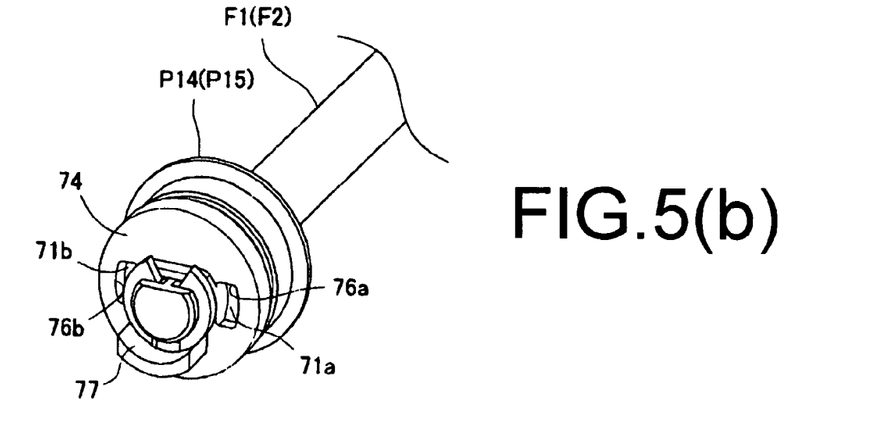
Figure 6:
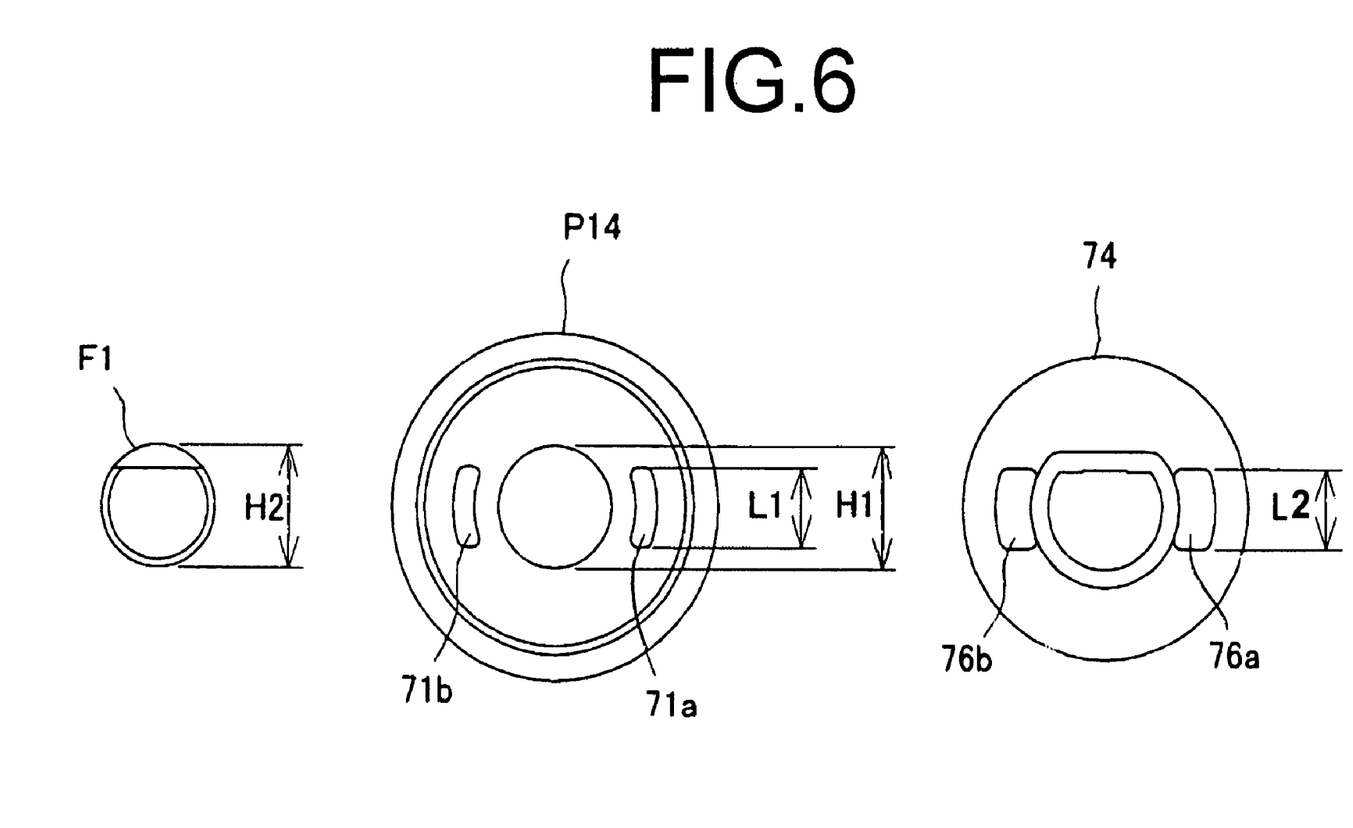
FIG. 6 is a plan view showing a coupling state of a pulley and pulley holder.

As shown in FIG. 5(a), the shaft transmission mechanism is comprised of the shaft F1 (F2) formed of a D-shaped cross-section part 81 obtained by cutting the end portion to be D-shaped cross section, and a circular cross-section part 80 with circular cross section in the center portion of the shaft, the pulley P14 (P15) as a transmission rotary member in which is formed a circular fit hole 70 to fit with the circular cross-section part 80, and a pulley holder 74 in which is formed a D-shaped press-fit hole 75 to press-fit to the D-shaped cross-section part 81 of the shaft F1 (F2). In addition, in this embodiment, the press-fit hole 75 is formed to be smaller than the D-shaped cross-section part 81 of the shaft F1 (F2) by 0.02 mm.

Further, convex portions 71a, 71b are formed in symmetric positions with respect to the fit hole 70 in the side of the pulley P14 (P15), while concave portions 76a, 76b are formed in symmetric positions with respect to the press-fit hole 75 of the pulley holder 74. By press-fitting the convex portions 71a, 71b of the pulley P14 (P15) to the concave portions 76a, 76b of the pulley holder 74, the pulley P14 (P15) and pulley holder 74 are secured and coupled. In other words, the convex portions 71a, 71b and the concave portions 76a, 76b are configured as coupling means to couple the pulley P14 (P15) and pulley holder 74.

Then, the pulley P14 (P15) with the circular fit hole 70 formed is fitted with the circular cross-section part 80 of the shaft F1 (F2), and the pulley holder 74 with the D-shaped press-fit hole 75 is press-fitted to the D-shaped cross-section part 81 of the shaft F1 (F2). Further, in press-fitting the pulley holder 74 to the shaft F1 (F2), the concave portions 76a, 76b are press-fitted to the convex portions 71a, 71b of the pulley P14 (P15), and the pulley P14 (P15) and pulley holder 74 are coupled. By this means, as shown in FIG. 5(b), in the state where the pulley P14 (P15) and pulley holder 74 are attached to the shaft F1 (F2), driving of the transport motor M2 transferred to the pulley P14 (P15) by the timing belt T11 is reliably transferred to the shaft F1 (F2) via the pulley holder 74 fixed to the shaft F1 (F2).

In addition, the concave portions 76a, 76b of the pulley holder 74 and the convex portions 71a, 71b of the pulley P14 (P15) are formed along the rotation direction of the pulley P14 (P15) as shown in FIG. 6, and a length L1 in the rotation direction of the convex portions 71a, 71b of the pulley P14 (P15) is formed to be longer than a length L2 in the rotation direction of the concave portions 76a, 76b of the pulley holder 74. By this means, the pulley P14 (P15) and pulley holder 74 do not cause misalignment by the rotation driving of the pulley P14 (P15) after press-fitting, and the rotation driving of the pulley P14 (P15) is transferred to the pulley holder 74 without loss.

Further, in this embodiment, in the circular fit hole 70 of the pulley P14 (P15), as shown in FIG. 6, the diameter H1 is formed to be the same or smaller by about 0.01 mm than the diameter H2 of the circular cross-section part 80 of the shaft F1 (F2). In this case, the stress in fitting is small, while being substantially uniform on the circumference of the contact face between the fit hole 70 and shaft F1 (F2) because the fit hole 70 of the pulley P14 (P15) is circular, and therefore, does not deform part of the outer face of the pulley P14 (P15).

Reference numeral "77" in FIG. 5(a) is an E ring as an engagement member to prevent the press-fitted pulley holder 74 from slipping from the end portion of the shaft F1 (F2).

In the aforementioned configuration, since the fit hole of the pulley is made circular and the pulley is press-fitted to the shaft in cylindrical form, the stress can be made uniform on the circumference of the contact face, eliminating the error of outer circularity caused by misalignment of central axes of the pulley and shaft and local deformation. Further, the pulley holder and shaft are configured to be press-fitted and fastened in D form, and therefore, rotation transmission efficiency is not impaired from the pulley to the shaft. By this means, improved are fluctuations in rotation due to variations in rotation phase of the pulley i.e. fluctuations in original document sheet feeding, and it is possible to obtain excellent read images.

The original document sheet tray 20 is provided with a plurality of sensors S1, S2, a volume VR is further provided to detect a width of an original document sheet from the plurality of sensors S1, S2 and a shift amount of the side guide 22 for regulating the width direction of the sheet, and the original document sheet size is determined from these detection output signals.

Figure 7:
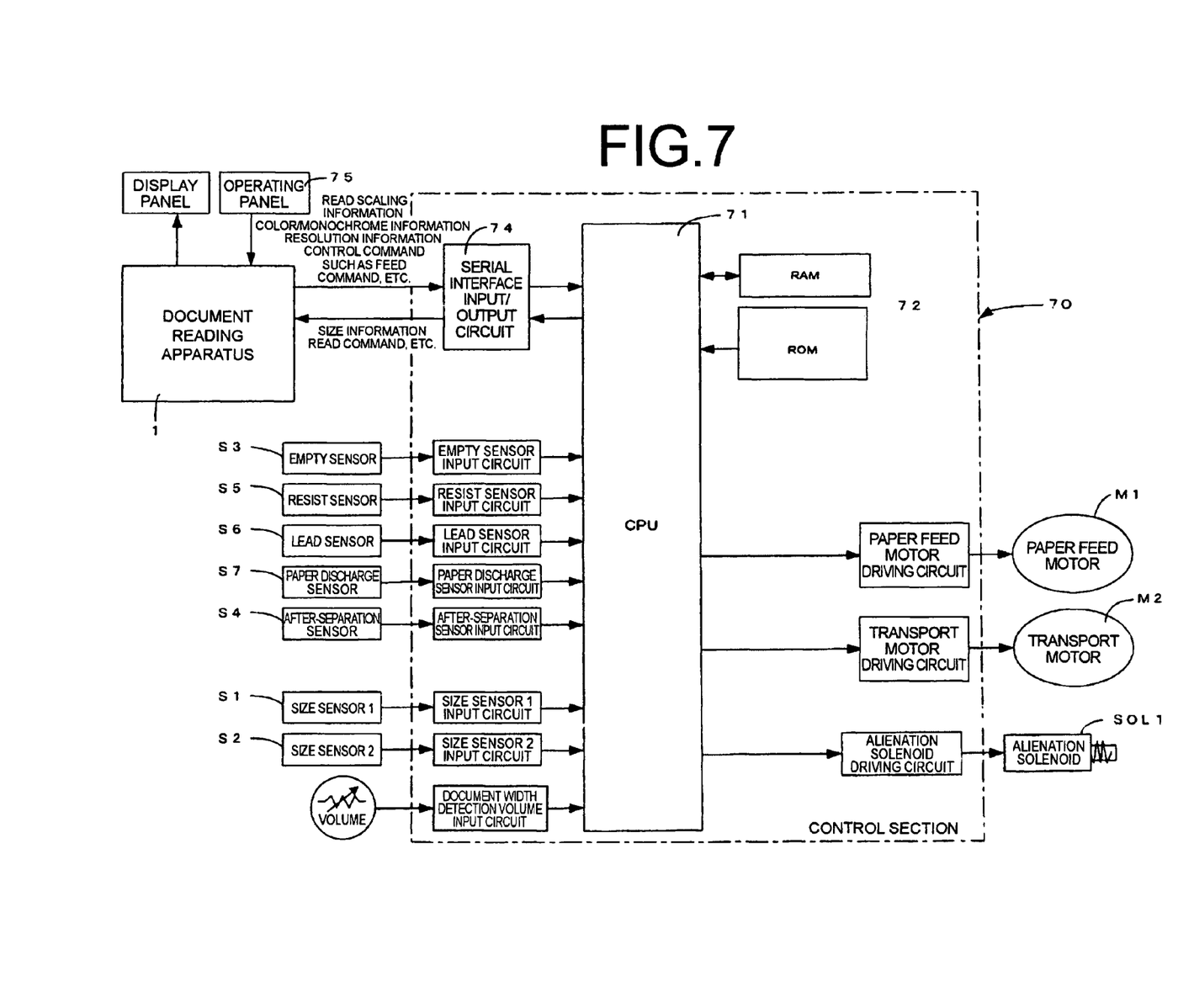
FIG. 7 is a control block diagram of the sheet transport apparatus.

Further, in the path for guiding an original document sheet are provided an empty sensor S3 for detecting that the original document sheet is mounted on the paper feed tray 20, and a plurality of original document detection sensors S4, S5, S6, S7. As shown in the block diagram of FIG. 7, an output of each of the sensors S3 to S7 is input to a CPU 71 mounted on a control board 70 as control means for controlling driving of the entire apparatus so as to control driving of each of the motors M1, M2 and alienation solenoid SOL1.

The sheet transport apparatus comprised of the above-mentioned configuration has the one-side mode for reading only one side of an original document sheet, and the two-side mode for reading both sides of an original document sheet, and these modes are set on an operating panel of the scanner body 1, and transmitted to the sheet transport apparatus 2 as read information.

Described next is the original document sheet transport operation in the one-side mode. When the empty sensor S3 detects that original document sheets are mounted on the paper feed tray 20, with respect to the first original document sheet, the feeding roller 32 and paper feed roller 33 are rotated by forward rotation driving of the paper feed motor M1 as in the one-side mode, the original document sheet is struck by the nip point of the resist roller pair 35 to remove skew, the paper feed motor M1 is driven and rotated backward to rotate the resist roller pair 35, and the original document sheet is fed toward the carry-in roller pair 42.

Concurrently with backward rotation driving of the paper feed motor M1, the transport motor M2 is driven and rotated forward to drive the carry-in roller pair 42 and carrying-out roller pair 43, the original document sheet fed to the carry-in roller pair 42 is transported to the reading position set on the top surface of the second contact glass 4 by the carry-in roller pair 42 and carrying-out roller pair 43. Then, in the process during which the original document sheet is transported over the reading position, the image of the sheet is read by the reading means. Then, the original documents sheet read in the reading position is discharged onto the paper discharge tray 21 by the paper discharge roller pair 52.

Described next is the two-side mode for reading both sides of an original document sheet. When the empty sensor S3 detects that original document sheets are mounted on the paper feed tray 20, as in the one-side mode, the feeding roller 32, paper feed roller 33 and resist roller are driven by the paper feed motor M1, and the original document sheet is fed toward the carry-in roller pair 42. Then, the carry-in roller pair 42 and carrying-out roller pair 43 are driven by forward rotation driving of the transport motor M2, and the original document sheet is supplied to the reading position and passed through. At this point, the surface (one side) of the original document sheet is read in the reading position by the reading means.

The read original document sheet is guided to the paper discharge path 51, and then, the transport motor M2 is driven to rotate backward. By this means, the paper discharge driving roller 52*a* is rotated backward, and the original document is switched back and fed to the switch back path 61.

The original document sheet sent to the switch back path 61 is fed again to the reading position from the resist roller pair 35 via the carry-in roller 42, and the backside (both-side) is read in the reading position by the reading means. The read original document sheet is sent toward the paper discharge tray 21 along the paper discharge path 51.

Subsequently, to discharge the original document sheet to the paper discharge tray 21 while collating, the original document sheet is passed through the reading position again via the switch back path 61, the side of the original document sheet is reversed, and the original document sheet is sent to the paper discharge path 51. Then, the original document sheet fed to the paper discharge tray 51 is discharged to the paper discharge tray 21 by the paper discharge roller 52.

In addition, in this embodiment, the pulley holder 74 with the D-shaped press-fit hole 75 formed therein is press-fitted to the D-shaped cross-section part 81 of the shaft F1 (F2), but the shapes of the press-fit part of the shaft F1 (F2) and the press-fit hole of the pulley holder 74 press-fitted to the press-fit part only require forms such that a part of a circle is cut, and it is thereby possible to transfer driving of the driving motor to the shaft without loss.

The above-mentioned embodiment describes the pulley as a driving transmission component attached to the shaft, but a gear can be used as a driving transmission component attached to the shaft. In this case, it is only required to replace the pulley as described above with a gear with a circular fit hole formed therein. In other words, the gear with a circular fit hole formed therein is fitted with the circular cross-section part of the shaft F1 (F2), and the holder with the D-shaped press-fit hole formed therein is press-fitted to the D-shaped cross-section part of the shaft. Further, in press-fitting the holder to the shaft, the concave portions of the holder are press-fitted to the convex portions of the gear and coupled. This manner prevents local deformation from occurring in the outer face of the gear, improves fluctuations in velocity of the original document sheet due to back crush caused by the deformation, and enables excellent read images to be obtained.

Further, the above-mentioned embodiment adopts the shaft driving transmission mechanism comprised of the transmission rotary member and the holder member for transferring driving to the shaft of each of the carry-in roller and carrying-out roller for transporting an original document sheet at a constant velocity to the reading position of the sheet transport apparatus provided in a scanner, but the invention is not limited thereto. For example, as in the above-mentioned manner, the shaft driving transmission mechanism comprised of the transmission rotary member and the holder member may be applied to a roller shaft for transporting a sheet at a constant velocity to an image formation position of an image formation apparatus such as a copier, printer, facsimile and the like, and it is thereby possible to obtain excellent formed images.

What is claimed is:

1. A sheet transport apparatus for transporting a sheet to a processing section having a processing position to process the sheet, comprising:
    at least one transport roller for transporting a sheet to the processing section at a predetermined velocity;
    a driving motor for driving the at least one transport roller; and
    a driving transmission mechanism for transferring driving of the driving motor to the transport roller,
    wherein the driving transmission mechanism comprises
    a rotary shaft for supporting the transport roller,
    a transmission rotary member having a circular fit hole,
    a holder member with a press-fit hole formed therein, the press-fit hole having a curved part and a flat part, and
    a coupling mechanism for coupling the holder member and the transmission rotary member,
    wherein the rotary shaft comprises
    a fitting part having a circular cross section at one end side on the rotary shaft to be fitted into the circular fit hole of the transmission rotary member, and
    a press-fit part having a curved part and a flat part press-fitted with the press-fit hole of the holder member, and
    wherein the coupling mechanism comprises
    a convex portion formed on a side of the transmission rotary member, and
    a concave portion formed on a side of the holder member press-fitted with the convex portion of the transmission rotary member.

2. The sheet transport apparatus according to claim 1, wherein the transmission rotary member and the holder member are formed of resin.

3. The sheet transport apparatus according to claim 1, wherein a length in a rotation direction of the convex portion of the transmission rotary member is formed to be longer than a length in a rotation direction of the concave portion of the holder member.

4. The sheet transport apparatus according to claim 1, wherein the press-fit hole of the holder member is formed in a D-shape, and the press-fit part on the one end side of the rotary shaft is formed in a D-shaped cross section.

5. The sheet transport apparatus according to claim 3, wherein the transmission rotary member is a pulley or a gear for transferring the driving of the driving motor to the driving shaft via the holder member, and the pulley or the gear is formed of resin.

6. An image reading apparatus, comprising:
    the sheet transport apparatus according to claim 1,
    a reading section having a reading position to read a sheet image;
    an image reader for reading an image of the sheet transported through the reading section in the reading position;
    a first transport roller disposed on an upstream side of the reading section to feed a sheet;

a second transport roller disposed on a downstream side of the reading section to discharge the sheet read in the reading section; and driving mechanisms for driving the first transport roller and the second transport roller, both of the first transport roller and the second transport roller having the driving transmission mechanism.

7. The image reading apparatus according to claim 6, wherein the image reader has a first, a second, and a third line sensors arranged in line, a light source for applying light to a sheet, and a plurality of mirrors and lens for leading light reflected from the sheet to each of the line sensors.

8. The sheet transport apparatus according to claim 1, wherein the driving transmission mechanism includes a timing belt for transferring the driving of the driving motor to the transmission rotary member.

9. The sheet transport apparatus according to claim 1, wherein the convex portion formed on the side of the transmission rotary member comprises a plurality of curved projections spaced apart from each other and formed along a rotation direction of the transmission rotary member, and the concave portion formed on the side of the holder member comprises a plurality of elongated holes spaced apart from each other and formed along the rotation direction of the transmission rotary member.

10. The sheet transport apparatus according to claim 9, wherein a length in the rotation direction of the curved projections is longer than a length in the rotational direction of the elongated holes in a range to be engaged together.

* * * * *